(12) United States Patent
Lu et al.

(10) Patent No.: US 9,291,780 B2
(45) Date of Patent: Mar. 22, 2016

(54) RUGGEDIZED MULTI-FIBER FIBER OPTIC CONNECTOR WITH SEALED DUST CAP

(71) Applicant: ADC Telecommunications, Inc., Berwyn, PA (US)

(72) Inventors: Yu Lu, Eden Prairie, MN (US); Gregory J. Schaible, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/605,390

(22) Filed: Jan. 26, 2015

(65) Prior Publication Data

US 2015/0241639 A1  Aug. 27, 2015

Related U.S. Application Data

(63) Continuation of application No. 14/024,272, filed on Sep. 11, 2013, now Pat. No. 8,939,654.

(60) Provisional application No. 61/706,414, filed on Sep. 27, 2012.

(51) Int. Cl.
*G02B 6/38* (2006.01)
*G02B 6/44* (2006.01)

(52) U.S. Cl.
CPC ............... *G02B 6/3849* (2013.01); *G02B 6/38* (2013.01); *G02B 6/3885* (2013.01); *G02B 6/4465* (2013.01)

(58) Field of Classification Search
CPC ... G02B 6/4465; G02B 6/4466; G02B 6/3849
See application file for complete search history.

(56) References Cited

U.S. PATENT DOCUMENTS

| 2,027,962 A | 1/1936 | Currie |
| 3,086,242 A | 4/1963 | Cook et al. |
| 3,597,372 A | 8/1971 | Cook |

(Continued)

FOREIGN PATENT DOCUMENTS

| CA | 2 354 718 A1 | 3/2002 |
| DE | 195 17 750 A1 | 11/1996 |

(Continued)

OTHER PUBLICATIONS

"Considerations for Optical Fiber Termination," AEN 89, Revision 3, Corning Cable Systems LLC, pp. 1-7 (Copyright 2008).
FuseConnect™ Fusion Spliced Field-terminated SC Connector, AFL Telecommunications, 6 pages (Copyright 2007).

(Continued)

*Primary Examiner* — Michelle R Connelly
*Assistant Examiner* — Hoang Tran
(74) *Attorney, Agent, or Firm* — Merchant & Gould P.C.

(57) ABSTRACT

A fiber optic connector and fiber optic cable assembly is disclosed. The assembly includes a fiber optic cable having a plurality of optical fibers. The assembly also includes a connector body, a multi-fiber ferrule and a protective housing. The fiber optic cable is anchored to a proximal end of the connector body and the multi-fiber ferrule is mounted at a distal end of the connector body. The multi-fiber ferrule supports end portions of optical fibers of the optical fiber cable. The protective housing mounts over the connector body. A dimensionally recoverable sleeve prevents contaminants from entering the protective housing through a proximal end of the protective housing. A dust cap and sealing member prevent contaminants from entering the protective housing through a distal end of the protective housing.

8 Claims, 11 Drawing Sheets

(56) References Cited

U.S. PATENT DOCUMENTS

| | | | |
|---|---|---|---|
| 3,777,048 A | 12/1973 | Traut | |
| 4,220,394 A | 9/1980 | Tardy | |
| 4,389,428 A | 6/1983 | McDuffee et al. | |
| 4,410,469 A | 10/1983 | Katagiri et al. | |
| 4,410,561 A | 10/1983 | Hart, Jr. | |
| 4,598,974 A | 7/1986 | Munn et al. | |
| 4,662,307 A | 5/1987 | Amos et al. | |
| 4,711,752 A | 12/1987 | Deacon et al. | |
| 4,798,431 A | 1/1989 | Clark et al. | |
| 4,877,303 A | 10/1989 | Caldwell et al. | |
| 4,877,306 A | 10/1989 | Kar | |
| 4,902,095 A | 2/1990 | Baker et al. | |
| 4,920,366 A | 4/1990 | Bowen et al. | |
| 4,964,688 A | 10/1990 | Caldwell et al. | |
| 5,022,735 A | 6/1991 | Dahlgren | |
| 5,034,170 A | 7/1991 | Briggs, Jr. et al. | |
| 5,040,867 A | 8/1991 | de Jong et al. | |
| 5,042,901 A | 8/1991 | Merriken et al. | |
| 5,046,813 A | 9/1991 | Itoh et al. | |
| 5,093,048 A | 3/1992 | Kagan | |
| 5,127,820 A | 7/1992 | Briggs, Jr. et al. | |
| 5,222,171 A | 6/1993 | Straus | |
| 5,241,613 A | 8/1993 | Li et al. | |
| 5,263,105 A | 11/1993 | Johnson et al. | |
| 5,309,536 A | 5/1994 | Suganuma et al. | |
| 5,317,663 A | 5/1994 | Beard et al. | |
| 5,367,594 A | 11/1994 | Essert et al. | |
| 5,375,183 A | 12/1994 | Edwards et al. | |
| 5,465,313 A | 11/1995 | Belenkiy et al. | |
| 5,495,545 A | 2/1996 | Cina et al. | |
| 5,582,671 A | 12/1996 | Harman et al. | |
| 5,677,976 A | 10/1997 | Takahashi | |
| 5,748,819 A | 5/1998 | Szentesi et al. | |
| 5,815,619 A | 9/1998 | Bloom | |
| 5,832,162 A | 11/1998 | Sarbell | |
| 5,909,528 A | 6/1999 | Tamekuni et al. | |
| 5,963,692 A | 10/1999 | Marazzi et al. | |
| 5,963,698 A | 10/1999 | Brugger et al. | |
| 6,068,410 A | 5/2000 | Giebel et al. | |
| 6,120,193 A | 9/2000 | Luther et al. | |
| 6,152,609 A | 11/2000 | Dzyck et al. | |
| 6,173,097 B1 | 1/2001 | Throckmorton et al. | |
| 6,179,482 B1 | 1/2001 | Takizawa et al. | |
| 6,186,672 B1 | 2/2001 | Takizawa et al. | |
| 6,247,850 B1 | 6/2001 | Edwards et al. | |
| 6,340,249 B1 | 1/2002 | Hayes et al. | |
| 6,419,810 B1 | 7/2002 | Tanaka et al. | |
| 6,439,780 B1 | 8/2002 | Mudd et al. | |
| 6,498,888 B1 | 12/2002 | Chenard et al. | |
| 6,503,422 B2 | 1/2003 | Chuboda et al. | |
| 6,520,689 B2 | 2/2003 | DeMartino et al. | |
| 6,532,327 B1 | 3/2003 | Gatica et al. | |
| 6,550,279 B1 | 4/2003 | Anderson et al. | |
| 6,648,520 B2 | 11/2003 | McDonald et al. | |
| 6,715,933 B1 | 4/2004 | Zimmer et al. | |
| 6,719,927 B2 | 4/2004 | Sakurai et al. | |
| 6,726,370 B2 | 4/2004 | Shimotsu | |
| 6,728,452 B2 | 4/2004 | Nishimura | |
| 6,738,552 B2 | 5/2004 | Hirsch | |
| 6,742,936 B1 | 6/2004 | Knecht et al. | |
| 6,811,323 B2 | 11/2004 | Murray et al. | |
| 6,827,508 B2 | 12/2004 | Stowe | |
| 6,840,687 B2 | 1/2005 | Riis et al. | |
| 6,856,748 B1 | 2/2005 | Elkins, II et al. | |
| 6,908,236 B2 | 6/2005 | Oishi et al. | |
| 6,918,703 B2 | 7/2005 | Chen et al. | |
| 6,962,446 B2 | 11/2005 | Greub et al. | |
| 6,964,578 B2 | 11/2005 | Clark et al. | |
| 6,979,133 B2 | 12/2005 | Montena | |
| 7,016,592 B2 | 3/2006 | Elkins, II et al. | |
| 7,088,893 B2 | 8/2006 | Cooke et al. | |
| 7,090,406 B2 | 8/2006 | Melton et al. | |
| 7,104,702 B2 | 9/2006 | Barnes et al. | |
| 7,140,786 B2 | 11/2006 | Takayanagi et al. | |
| 7,216,512 B2 | 5/2007 | Danley et al. | |
| 7,220,061 B2 | 5/2007 | De Marchi | |
| 7,264,402 B2 * | 9/2007 | Theuerkorn et al. | 385/59 |
| 7,264,410 B1 | 9/2007 | Doss et al. | |
| 7,298,941 B2 | 11/2007 | Palen et al. | |
| 7,329,049 B2 | 2/2008 | Meek et al. | |
| 7,507,031 B2 | 3/2009 | Kawasaki | |
| 7,572,065 B2 | 8/2009 | Lu et al. | |
| 7,594,764 B2 | 9/2009 | Palmer et al. | |
| 7,628,549 B2 | 12/2009 | Takahashi et al. | |
| 7,708,476 B2 | 5/2010 | Liu | |
| 7,744,286 B2 | 6/2010 | Lu et al. | |
| 7,744,288 B2 | 6/2010 | Lu et al. | |
| 7,756,370 B2 | 7/2010 | Hayasaka | |
| 7,762,726 B2 | 7/2010 | Lu et al. | |
| 7,764,402 B2 | 7/2010 | Kakutani et al. | |
| 7,860,363 B2 | 12/2010 | Kawasaki | |
| 7,942,590 B2 | 5/2011 | Lu et al. | |
| 8,041,166 B2 | 10/2011 | Kachmar | |
| 8,043,013 B2 | 10/2011 | Lichoulas et al. | |
| 8,939,654 B2 | 1/2015 | Lu et al. | |
| 2001/0017963 A1 | 8/2001 | Shimotsu | |
| 2002/0044749 A1 | 4/2002 | Koike et al. | |
| 2002/0131720 A1 | 9/2002 | Chudoba et al. | |
| 2002/0146214 A1 | 10/2002 | Tanaka et al. | |
| 2003/0044143 A1 | 3/2003 | Trentelman et al. | |
| 2004/0047566 A1 | 3/2004 | McDonald et al. | |
| 2004/0062480 A1 | 4/2004 | Cronk et al. | |
| 2004/0151437 A1 | 8/2004 | Marrs et al. | |
| 2005/0042387 A1 | 2/2005 | Dower | |
| 2005/0175308 A1 | 8/2005 | Elkins, II et al. | |
| 2005/0213891 A1 | 9/2005 | Hardcastle et al. | |
| 2005/0238292 A1 | 10/2005 | Barnes et al. | |
| 2005/0276549 A1 | 12/2005 | Tabata et al. | |
| 2006/0002662 A1 | 1/2006 | Manning et al. | |
| 2006/0103039 A1 | 5/2006 | Shields et al. | |
| 2006/0233506 A1 | 10/2006 | Noonan et al. | |
| 2007/0110371 A1 | 5/2007 | Zimmel et al. | |
| 2007/0274657 A1 | 11/2007 | Billman et al. | |
| 2008/0069500 A1 | 3/2008 | Harness et al. | |
| 2008/0095504 A1 | 4/2008 | Kawasaki | |
| 2008/0131056 A1 | 6/2008 | Isenhour et al. | |
| 2008/0193089 A1 | 8/2008 | Miyamoto et al. | |
| 2008/0219624 A1 | 9/2008 | Pimpinella et al. | |
| 2009/0162019 A1 | 6/2009 | Lichoulas et al. | |
| 2010/0124394 A1 | 5/2010 | Meek et al. | |
| 2010/0129031 A1 | 5/2010 | Danley et al. | |
| 2010/0266242 A1 | 10/2010 | Lu et al. | |
| 2010/0266244 A1 | 10/2010 | Lu et al. | |
| 2010/0284653 A1 | 11/2010 | Tamekuni et al. | |
| 2010/0290741 A1 | 11/2010 | Lu et al. | |
| 2010/0303425 A1 | 12/2010 | Liu | |
| 2010/0322568 A1 | 12/2010 | Zimmel et al. | |
| 2011/0002586 A1 | 1/2011 | Nhep | |
| 2011/0097432 A1 | 4/2011 | Yu et al. | |
| 2011/0103753 A1 | 5/2011 | Wouters | |
| 2011/0173817 A1 | 7/2011 | Barnes et al. | |
| 2011/0176774 A1 | 7/2011 | Barnes et al. | |
| 2011/0176780 A1 | 7/2011 | Barnes et al. | |
| 2011/0188813 A1 | 8/2011 | Marcouiller et al. | |
| 2011/0226019 A1 | 9/2011 | Huang et al. | |
| 2011/0280525 A1 | 11/2011 | Marcouiller et al. | |
| 2012/0177328 A1 | 7/2012 | Marcouiller et al. | |
| 2012/0219258 A1 | 8/2012 | Grandidge et al. | |
| 2012/0243832 A1 | 9/2012 | Tamekuni et al. | |
| 2012/0288238 A1 | 11/2012 | Park et al. | |
| 2013/0008594 A1 | 1/2013 | Takeuchi et al. | |
| 2013/0136857 A1 | 5/2013 | Blanchetiere et al. | |
| 2014/0064665 A1 | 3/2014 | Ott et al. | |
| 2014/0086534 A1 | 3/2014 | Lu et al. | |
| 2014/0321813 A1 | 10/2014 | Lu | |

FOREIGN PATENT DOCUMENTS

| | | |
|---|---|---|
| EP | 0 125 398 A1 | 11/1984 |
| EP | 1 122 564 A2 | 8/2001 |
| GB | 2 148 537 A | 5/1985 |
| JP | 61-9612 | 1/1986 |
| JP | 7-234344 | 9/1995 |
| JP | 8-234042 | 9/1996 |

(56) References Cited

FOREIGN PATENT DOCUMENTS

| | | |
|---|---|---|
| JP | 8-262271 | 10/1996 |
| JP | 2002-82257 | 3/2002 |
| JP | 2008-116840 | 5/2008 |
| JP | 2011-95410 | 5/2011 |
| TW | 571134 | 1/2004 |
| TW | 592934 | 6/2004 |
| WO | WO 01/27673 | 4/2001 |
| WO | WO 2004/028993 A1 | 4/2004 |
| WO | WO 2009/011799 A1 | 1/2009 |
| WO | WO 2010/090211 A1 | 8/2010 |
| WO | WO 2011/087941 A1 | 7/2011 |
| WO | WO 2011/087942 A1 | 7/2011 |
| WO | WO 2011/087944 A1 | 7/2011 |
| WO | WO 2012/005407 A1 | 1/2012 |

OTHER PUBLICATIONS

Abe, K. et al., "Modal interference in a short fiber section: fiber length, splice loss, cutoff, and wavelength dependences," *Optical Fiber Communication Conference*, p. 139, No. ThA3 (Feb. 1991).

De Jong, M., "Cleave and crimp fiber optic connector for field installation," *Optical Fiber Communication Conference, 1990 Technical Digest Series*, vol. 1, Conference Edition, 3 pages (Jan. 1990).

Duff, D.G. et al., "Measurements of modal noise in single-mode lightwave systems," *Conference on Optical Fiber Communication*, Paper No. TU01, 5 pages (Feb. 1985).

Goodwin, J.C. et al., "Modal Noise in Short Fiber Sections," *Journal of Lightwave Technology*, vol. 9, No. 8, pp. 954-958 (Aug. 1991).

Harris, D. et al., "Azimuthal Dependence of Modal Interference in Closely Spaced Single-Mode Fiber Joints," *IEEE Photonics Technology Letters*, vol. 6, No. 10, pp. 1235-1237 (Oct. 1994).

Harris, D.O. et al., "Characterizing Modal Interference in Field Installable Single-Mode Fiber Connectors Incorporating Short Fiber Stubs," *Technical Digest—Symposium on Optical Fiber Measurements*, NIST Special Publication 864, pp. 35-38 (Sep. 1994).

Heckmann, S., "Modal noise in single-mode fibres operated slightly above cutoff," *Electronics Letters*, vol. 17, No. 14, pp. 499-500 (Jul. 1981).

International Search Report and Written Opinion for PCT/US2013/061619 mailed Jan. 22, 2014.

Li, M-J. et al., "Optical Fiber Design for Field Mountable Connectors," *Journal of Lightwave Technology*, vol. 18, No. 3, pp. 314-319 (Mar. 2000).

Ohzawa, K. et al., "Development of new optical fiber fusion splicer for factory use," *International Wire & Cable Symposium Proceedings*, pp. 644-649 (1999).

Olson, G. et al., "Modal Noise in Single-Mode Fiber-Optic Systems with Closely Spaced Splices," *Fiber and Integrated Optics*, vol. 9, pp. 237-244 (1990).

Throckmorton, R. et al., "Modal Interference in Field Installable Single-Mode Fiber-Optic Connectors," *Proc. 10th National Fiber Optic Engineers Conference*, vol. 3, pp. 399-406 (1994).

\* cited by examiner

RUGGEDIZED MULTI-FIBER FIBER OPTIC CONNECTOR WITH SEALED DUST CAP

CROSS-REFERENCE TO RELATED APPLICATIONS

This application is a continuation of application Ser. No. 14/024,272, filed Sep. 11, 2013, now U.S. Pat. No. 8,939,654, issued on Jan. 27, 2015, which application claims the benefit of U.S. Provisional Patent Application Ser. No. 61/706,414, filed Sep. 27, 2012, which applications are incorporated herein by reference in their entirety.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respected optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A number of fiber optic connection systems have been developed for use in outside environments. Such connection systems typically have a ruggedized/hardened construction adapted for accommodating substantial pull-out forces. Such connection systems are also typically sealed to limit moisture intrusion. Example fiber optic connection systems adapted for outside use are disclosed in U.S. Pat. Nos. 6,648,520; 7,264,402; 7,572,065; 7,744,288; 7,762,726; 7,744,286; and 7,942,590.

SUMMARY

One aspect of the present disclosure relates to a fiber optic connector and fiber optic cable assembly. The fiber optic connector and fiber optic cable assembly includes a fiber optic cable including a plurality of optical fibers, at least one strength member for reinforcing the fiber optic cable, and a cable jacket for containing the optical fibers and the strength member. The fiber optic connector and fiber optic cable assembly also includes a connector body having a distal end and a proximal end. The proximal end of the connector body includes an anchoring region for anchoring the strength member of the fiber optic cable. The fiber optic connector and fiber optic cable assembly further includes a multi-fiber ferrule and a protective housing. The multi-fiber ferrule is mounted at the distal end of the connector body and supports end portions of the optical fibers. The protective housing is mounted over the connector body and includes a proximal end and a distal end. The fiber optic connector and fiber optic cable assembly further includes a dimensionally recoverable sleeve, a dust cap and a sealing member. The dimensionally recoverable sleeve is positioned over the proximal end of the protective housing and over the jacket of the fiber optic cable to secure the jacket to the protective housing and to prevent contaminants from entering the protective housing through the proximal end of the protective housing. The dust cap mounts over the distal end of the protective housing. The sealing member forms an environmental seal between the dust cap and the protective housing for preventing contaminants from entering the protective housing through the distal end of the protective housing.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
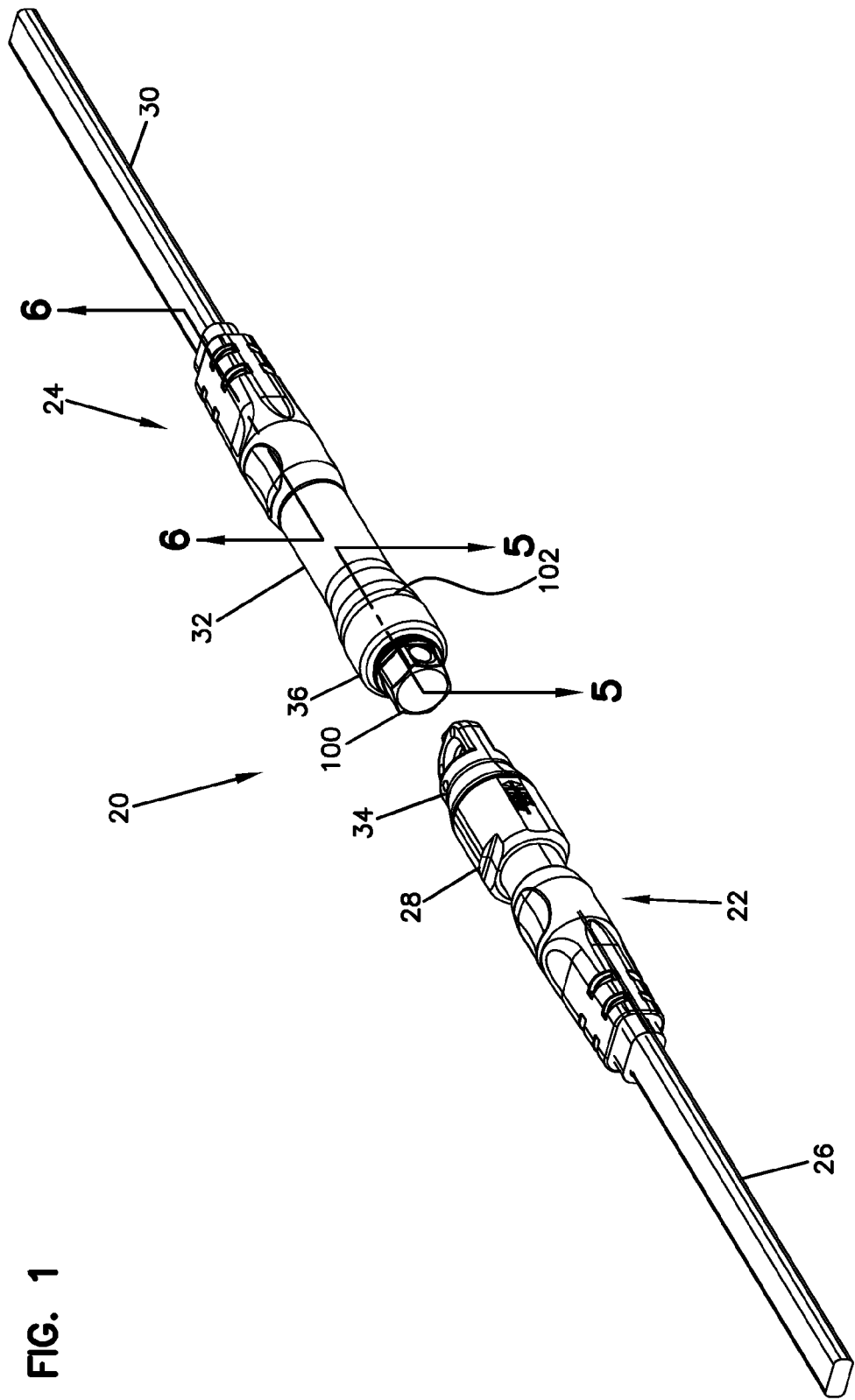
FIG. 1 is a perspective view of a fiber optic connection system in accordance with the principles of the present disclosure, the system is shown in a non-connected state.
Figure 2:
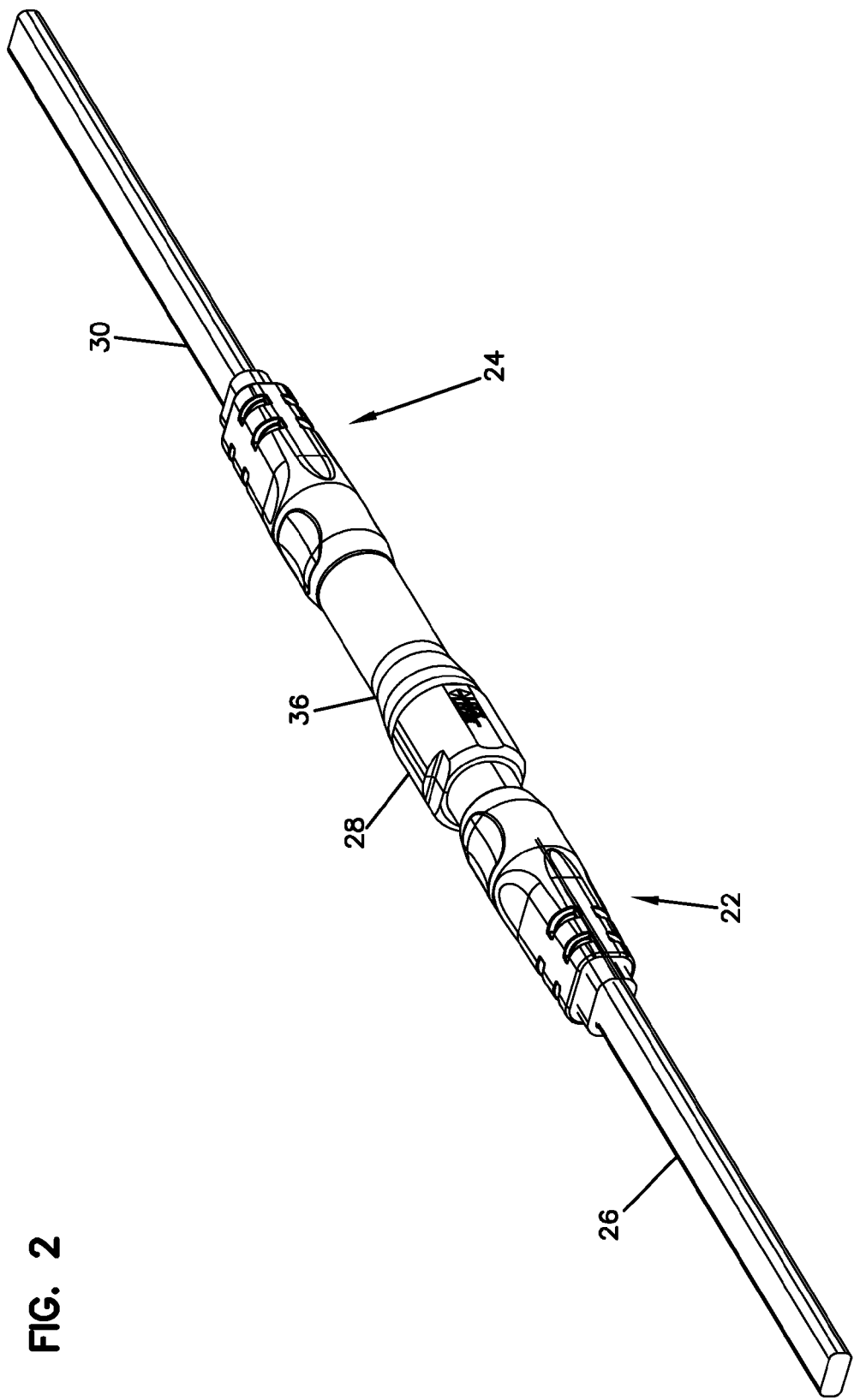
FIG. 2 is a perspective view showing the fiber optic connection system of FIG. 1 in a connected state.

FIG. 1 illustrates a ruggedized (i.e., hardened) multi-fiber fiber optic connection system 20 in accordance with the principles of the present disclosure. The multi-fiber fiber optic connection system 20 includes a first fiber optic connector and fiber optic cable assembly 22 and a second fiber optic connector and fiber optic cable assembly 24 that are configured to interconnect to provide a multi-fiber optical connection. The first fiber optic connector and fiber optic cable assembly 22 includes a multi-fiber cable 26 and a hardened connector in the form of a hardened plug 28. The hardened plug 28 is mounted on the end of the multi-fiber cable 26. The second fiber optic connector and fiber optic cable assembly 24 includes a multi-fiber cable 30 and a hardened connector in the form of a hardened jack 32. The hardened jack 32 is mounted at the end of the multi-fiber cable 30. As shown at FIG. 1, the hardened plug 28 and the hardened jack 32 respectively include dust caps 34, 36. The dust cap 34 protects an interface end of the hardened plug 28 when the hardened plug 28 is not connected to the hardened jack 32. Similarly, dust cap 36 protects an interface end of the hardened jack 32 when the hardened jack 32 is not connected to the hardened plug 28. By removing the dust caps 34, 36 from the hardened plug 28 and the hardened jack 32, the hardened plug 28 and the hardened jack 32 can be coupled together as shown at FIG. 2. When the hardened plug 28 and the hardened jack 32 are coupled together, optical fibers corresponding to the multi-fiber cable 26 are optically coupled to optical fibers corresponding to the multi-fiber cable 30.

Figure 3:
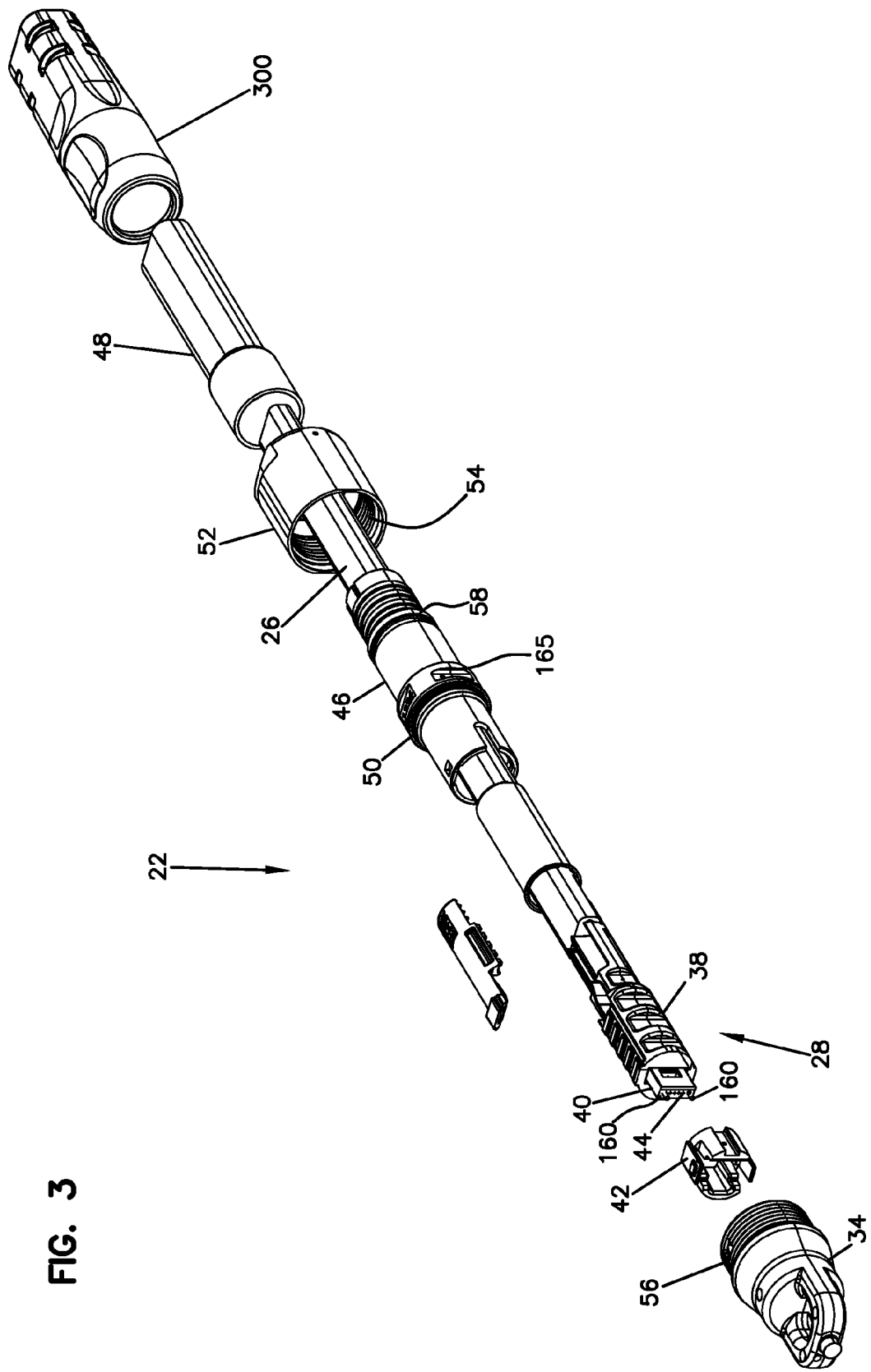
FIG. 3 is an exploded view of a first fiber optic connector and cable assembly of the fiber optic connection system of FIG. 1.

Referring to FIG. 3, the hardened plug 28 of the first fiber optic connector and fiber optic cable assembly 22 includes a connector body 38 supporting a multi-fiber ferrule 40 at the interface end of the hardened plug 28. An interface piece 42 mounts around the multi-fiber ferrule 40 at a distal end of the connector body 38. The multi-fiber ferrule 40 supports ends of a plurality of optical fibers 44 (e.g., 12 optical fibers) corresponding to the multi-fiber cable 26. Strength members (not shown) of the multi-fiber cable 26 are secured to a proximal end of the connector body 38. The hardened plug 28 also includes a protective housing 46 that mounts over the connector body 38. When assembled, the interface piece 42 snaps within a proximal end of the protective housing 46 such that the proximal end of the protective housing 46 and the interface piece 42 cooperate to define the interface end of the hardened plug 28. It will be appreciated that end faces of the optical fibers 44 secured within the multi-fiber ferrule 40 are accessible from the interface end of the hardened plug 28. A dimensionally recoverable sleeve 48 is secured over an outer jacket of the multi-fiber cable 26 and also over a proximal end of the protective housing 46. In this way, dimensionally recoverable sleeve 48 provides a sealing function that prevents moisture of contaminants from entering the interior of the protective housing 46 through the proximal end of the protective housing 46. A boot 300 mounts over the sleeve 48 and is retained on the proximal end of the protective housing 46 by a press-fit or snap-fit connection. The boot 300 is flexible and provides bend radius protection to the cable 26.

Referring still to FIG. 3, the hardened plug 28 includes a sealing member 50 (e.g., an o-ring seal) that is mounted on the protective housing 46 and circumferentially surrounds a periphery of the protective housing 46. The hardened plug 28 further includes a retention nut 52 that mounts over the protective housing 46. The retention nut 52 functions to retain the dust cap 34 over the interface end of the hardened plug 28. For example, the retention nut 52 includes internal threads 54 that mate with corresponding external threads 56 of the dust cap 34 to secure the dust cap 34 over the interface end of the hardened plug 28. When the dust cap 34 is secured to the retention nut 52, a proximal end of the retention nut 52 abuts against a shoulder 58 of the housing 46 to stop distal movement of the retention nut 52 relative to the protective housing 46. When the dust cap 34 is secured to the protective housing 46 via the retention nut 52, the dust cap 34 engages the sealing member 50 to form a seal that prevents moisture or other contaminants from entering the protective housing 46 through the distal end of the protective housing 46.

Figure 4:
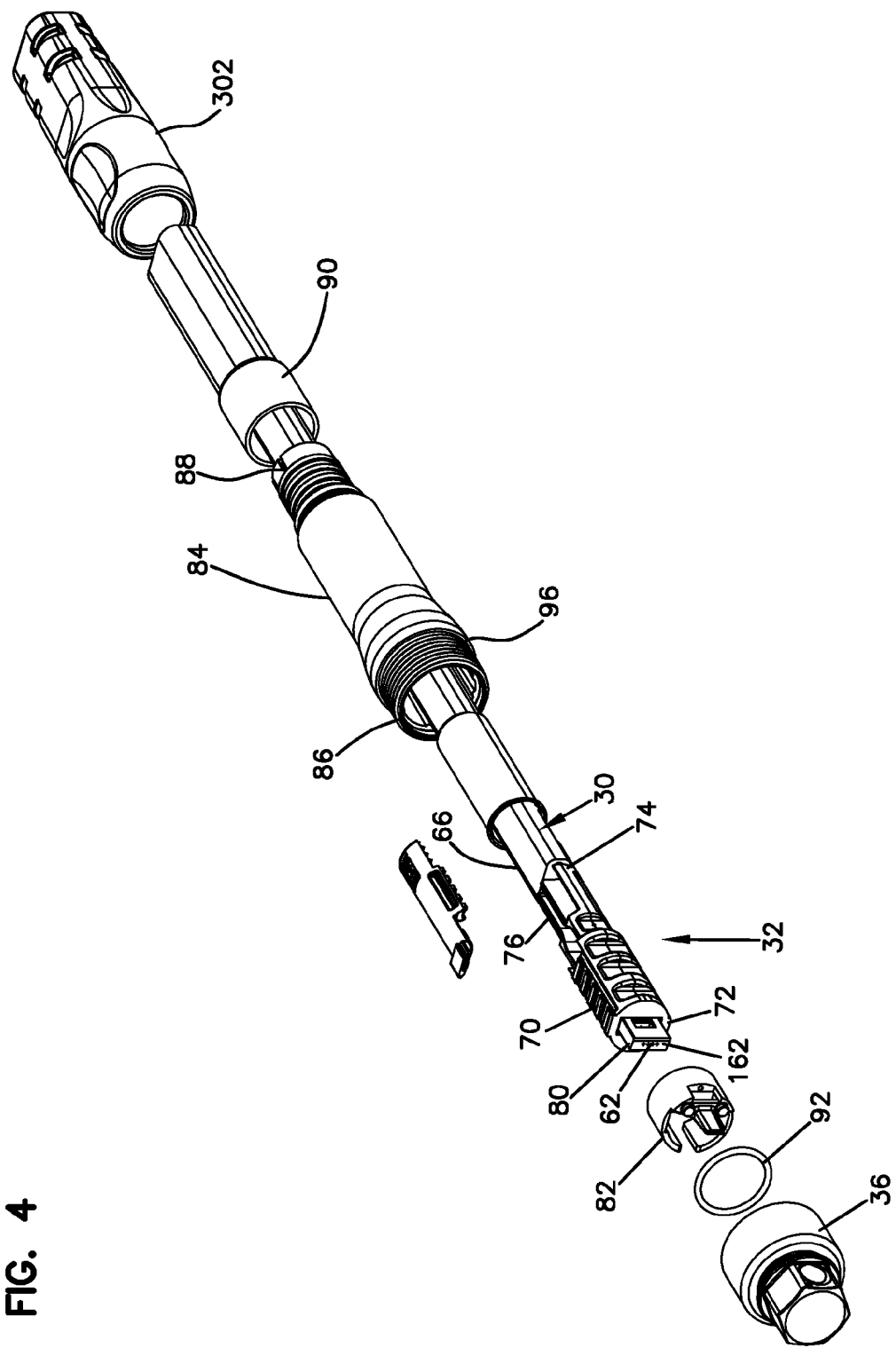
FIG. 4 is an exploded view of a second fiber optic connector and fiber optic cable assembly of the fiber optic connection system of FIG. 1.
Figure 6:
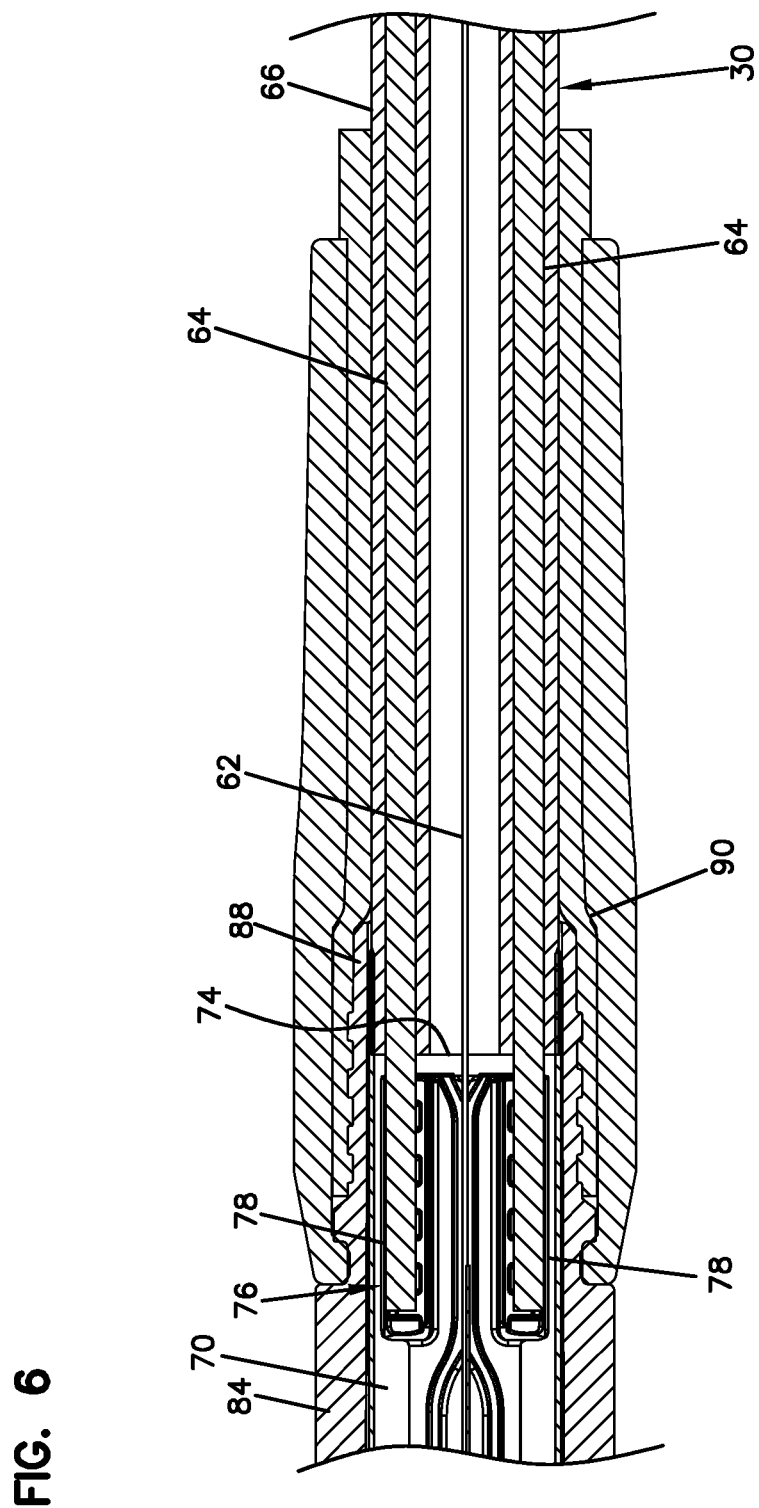
FIG. 6 is a cross-sectional view taken along section line 6-6 of FIG. 1.
Figure 7:
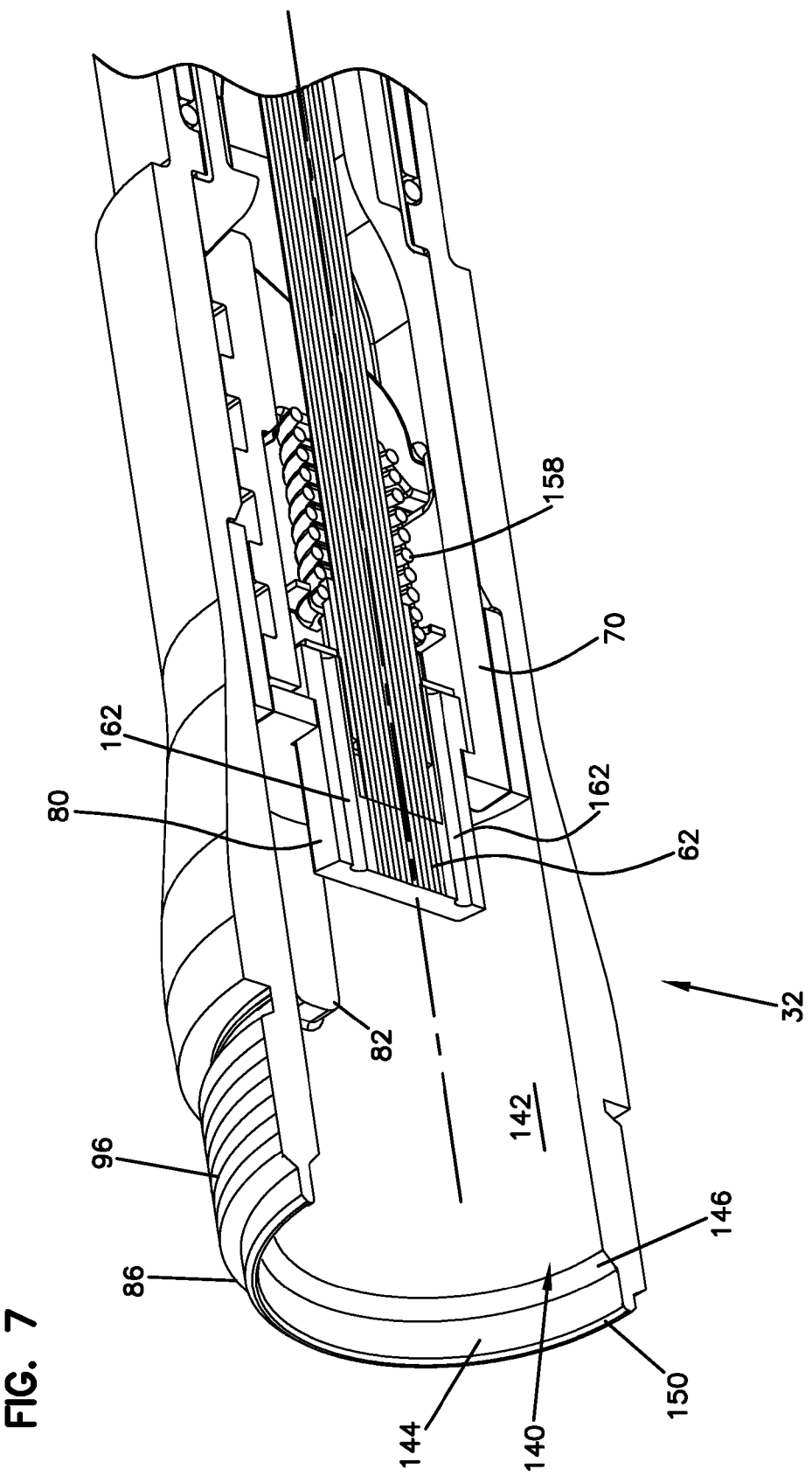
FIG. 7 is a cross-sectional view cut through a distal region of a jack of the fiber optic connector and fiber optic cable assembly of FIG. 4.

Referring to FIGS. 4, 6 and 7, the multi-fiber cable 30 of the second fiber optic connector and fiber optic cable assembly 24 includes a plurality of optical fibers 62 (e.g., 12 optical fibers). In FIG. 6, for clarity, only one of the fibers 62 is shown. The multi-fiber cable 30 also includes at least one strength member 64 for reinforcing the fiber optic cable 30. It will be appreciated that the strength member 64 can be configured to provide tensile and/or compressive reinforcement to the multi-fiber cable 30. In certain embodiments, structures such as aramid yarn and/or fiber reinforced epoxy rods can be used. In the depicted embodiment, two strength members 64 are provided. The multi-fiber cable 30 further includes a cable jacket 66 for containing the optical fibers 62 and the strength members 64. As shown at FIG. 4, the multi-fiber cable 30 is a flat drop-cable and the cable jacket 66 has an elongated profile when viewed in transverse cross section.

Referring to FIG. 4, the hardened jack 32 of the second fiber optic connector and the fiber optic cable assembly 24 includes a connector body 70 having a distal end 72 and a proximal end 74. The proximal end 74 includes an anchoring region 76 (see FIG. 6) for anchoring the strength members 64 of the multi-fiber cable 30. As depicted, the anchoring region 76 includes two parallel channels 78 in which the strength members 64 are received. The strength members 64 can be retained in the channels 78 by a material such as adhesive (e.g., epoxy) and can also be mechanically gripped within the channels 78. The channels 78 are best shown at FIG. 6.

Referring to FIG. 7, the hardened jack 32 includes a multi-fiber ferrule 80 mounted at the distal end 72 of the connector body 70. The multi-fiber ferrule 80 supports end portions of the optical fibers 62 of the multi-fiber cable 30. Polished end faces of the optical fibers 62 are positioned at a distal end of the multi-fiber ferrule 80. The hardened jack 32 also includes an interface piece 82 that mounts around the multi-fiber ferrule 80. A spring 158 is provided for biasing the multi-fiber ferrule 80 in a distal direction relative to the connector body 70.

Figure 8:
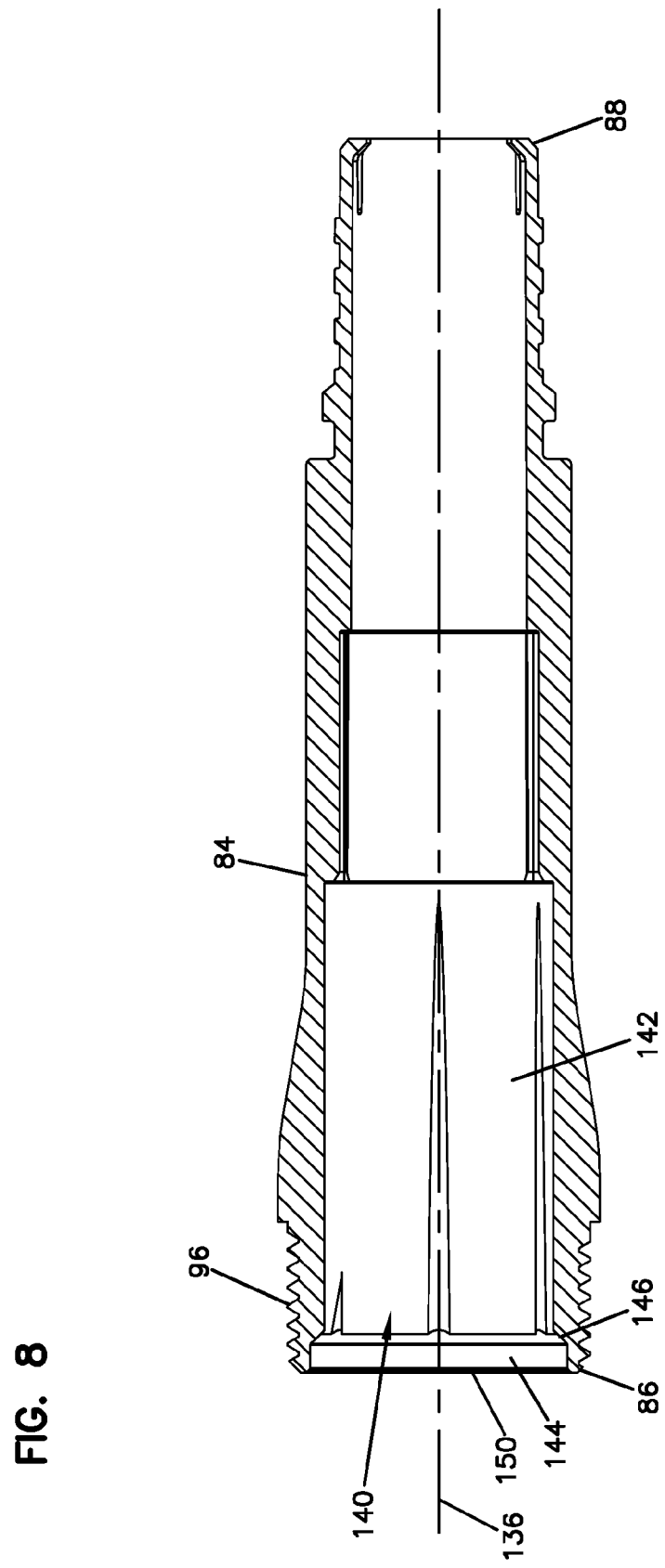
FIG. 8 is a cross-sectional view cut lengthwise through a connector body of the jack of the fiber optic connector and fiber optic cable assembly of FIG. 4.

Referring to FIGS. 4 and 8, the hardened jack 32 includes a protective housing 84 that mounts over the connector body 70. The protective housing 84 has a distal end 86 and a proximal end 88. The interface piece 82 fits within the distal end 86 of the protective housing 84 and the multi-fiber ferrule 88 is positioned within the interface piece 82. Thus, the interface piece 82, the multi-fiber ferrule 80 and the distal end 86 of the protective housing 84 cooperate to define the interface end of the hardened jack 32. Referring to FIGS. 4 and 6, the hardened jack 32 further includes a dimensionally recoverable sleeve 90 positioned over the proximal end 88 of the protective housing 84 and over the jacket 66 of the multi-fiber cable 30 to secure the jacket 66 to the protective housing 84 and to prevent moisture/contaminants from entering the protective housing 84 through the proximal end 88 of the protective housing 84. A boot 302 mounts over the sleeve 90 and is retained on the proximal end of the housing 84 by a press-fit or snap-fit connection. The boot 302 is flexible and provides bend radius protection to the cable 30.

Figure 9:
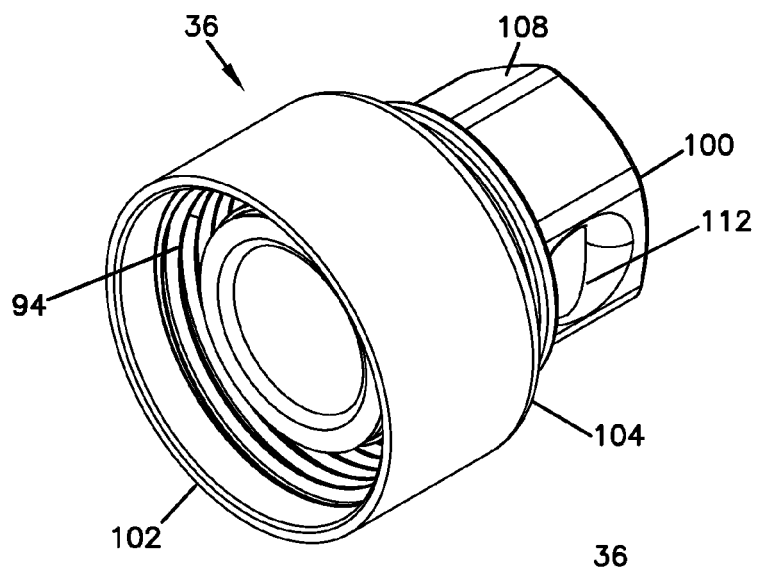
FIG. 9 is a perspective view of a dust cap of the fiber optic connector and fiber optic cable assembly of FIG. 4.
Figure 10:
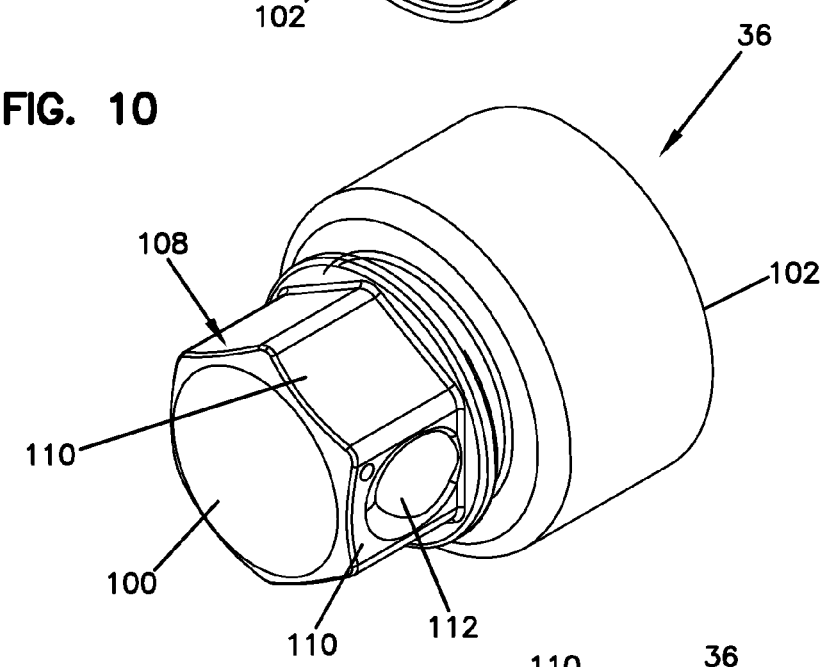
FIG. 10 is another perspective view of the dust cap of FIG. 9.
Figure 11:
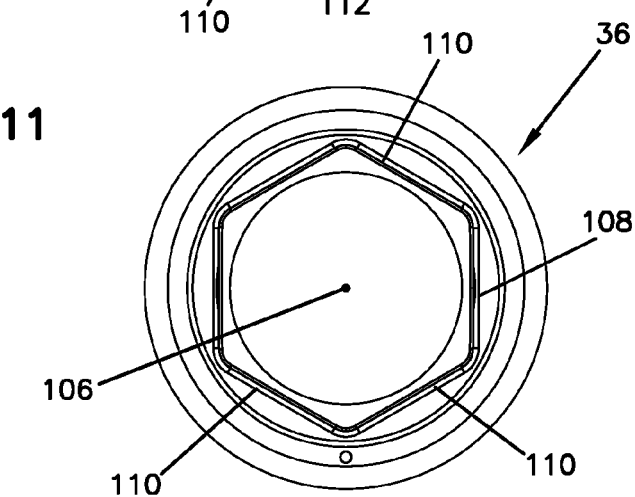
FIG. 11 is a distal end view of the dust cap of FIG. 9.

As shown at FIG. 4, the dust cap 36 is configured to mount over the distal end 86 of the protective housing 84. A sealing member 92 is used to form an environmental seal between the dust cap 36 and the protective housing 84 for preventing moisture/contaminants from entering the protective housing 84 through the distal end 86 of the protective housing 84. The dust cap 36 is secured to the distal end 86 of the protective housing by a threaded connection. For example, the dust cap 36 has internal threads 94 (see FIGS. 9 and 15) that mate with external threads 96 at the distal end 86 of the proximal housing 84 to secure the dust cap 36 on the protective housing 84.

Referring to FIGS. 9-15, the dust cap 36 corresponding to the hardened jack 32 includes a distal end 100 and a proximal end 102. The dust cap 36 also includes a main body 104 that defines a central dust cap axis 106 (see FIG. 15) that extends between the distal end proximal ends 100, 102 of the dust cap 36. The proximal end 102 of the dust cap 36 is configured to receive the distal end 86 of the protective housing 84. The dust cap 36 includes a distal projection 108 at the distal end 100 of the dust cap 36. The distal projection 108 projects distally outwardly from the main body 104 and is aligned along the central dust cap axis 106. The distal projection 108 has a plurality of wrench flats 110 for allowing a wrench to be used to tighten the threaded connection between the dust cap 36 and the distal end 86 of the protective housing 84 by turning the dust cap 36 relative to the protective housing 84 about the central dust cap axis 106. The distal projection 108 defines an opening 112 that forms a pulling eye for allowing a pulling member to be connected to the dust cap 36 and used to pull the fiber optic connector and cable assembly 24 through a conduit (e.g., a conduit in a building, an underground conduit, or other pipe or like structure in which a fiber optic structure can be routed during installation). The opening 112 extends through two of the wrench flats 110 of the distal projection 108. The opening 112 extends along an opening axis 114 that is perpendicular to the central dust cap axis 106.

Figure 12:
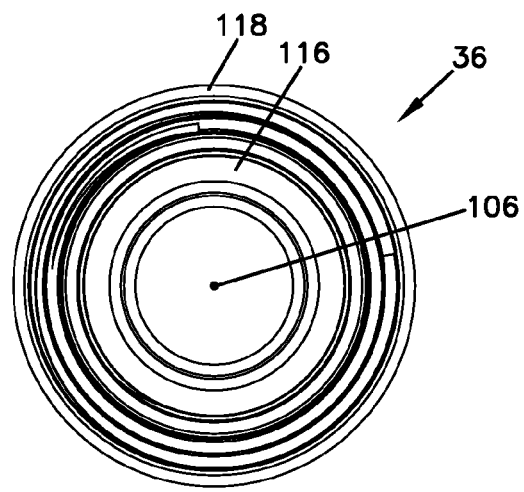
FIG. 12 is a proximal end view of the dust cap of FIG. 9.
Figure 13:
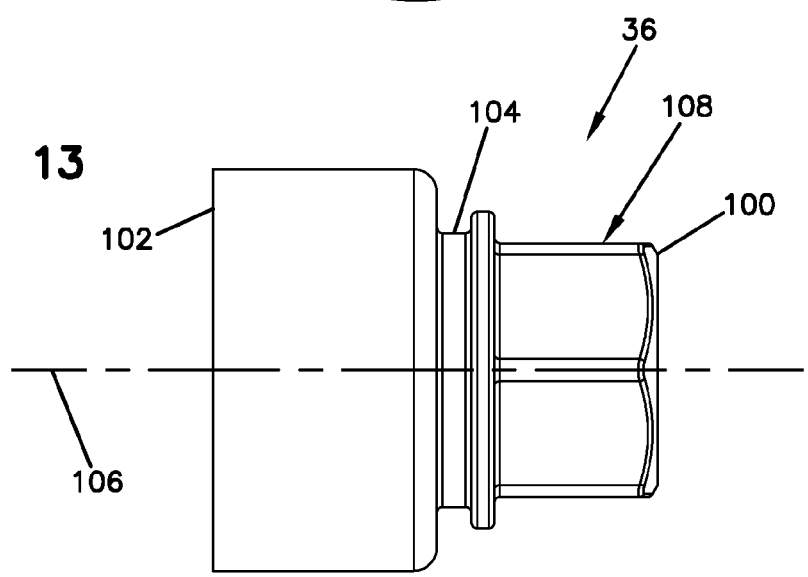
FIG. 13 is a top view of the dust cap of FIG. 9.
Figure 14:
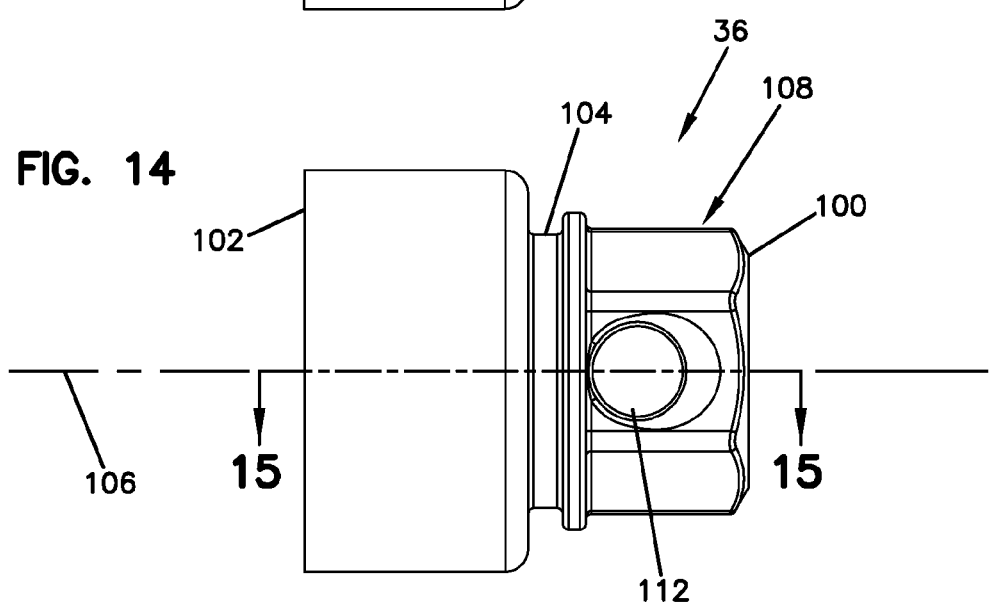
FIG. 14 is a side view of the dust cap of FIG. 9.
Figure 15:
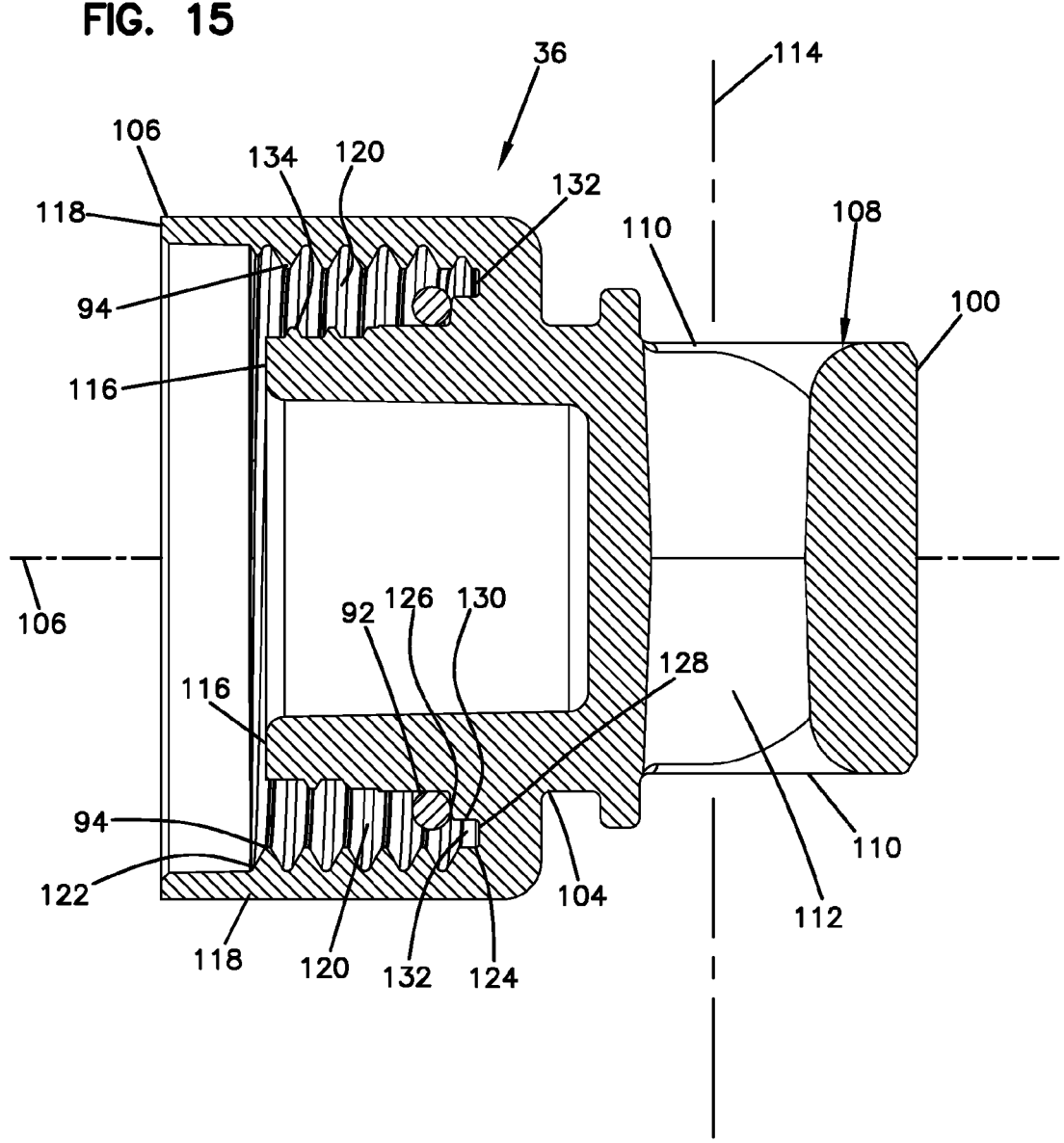
FIG. 15 is a cross-sectional view taken along section line 15-15 of FIG. 14.

Referring to FIGS. 12 and 15, the main body 104 of the dust cap 36 includes inner and outer sleeves 116, 118 that extend around the central dust cap axis 106. An annular receptacle 120 is defined between the inner and outer sleeves 116, 118. The annular receptacle 120 has an open end 122 opposite from a closed end 124. The open end 122 of the annular receptacle 120 faces in a proximal direction. The distal end 86 of the protective housing 84 of the hardened jack 32 is received within the annular receptacle 120 through the open end 122 of the annular receptacle 120 (see FIG. 5). The closed end 124 of the annular receptacle 120 has a stepped configuration. The stepped configuration includes first and second radial steps 126, 128 separated by an offset surface 130. The offset surface 130 extends distally from the first radial step 126 to the second radial step 128. The first radial step 126 extends radially outwardly from the inner sleeve 116 to the offset surface 130. The second radial step 128 extends radially outwardly from the offset surface 130 to the outer sleeve 118. The offset surface 130 and the second radial step 128 form a deepest portion 132 of the annular receptacle 120. As best shown at FIG. 15, the sealing member 92 (i.e., an annular sealing structure such as an o-ring) mounts over the inner sleeve 116 at a location adjacent the first radial step 126. The inner sleeve 116 includes inner-sleeve threads 134 positioned within the annular receptacle 120. The inner sleeve threads 134 face radially outwardly from the central dust plug axis 106. The inner-sleeve threads 134 function to retain the sealing member 92 within the annular receptacle 120 on the inner sleeve 116. The outer sleeve 118 defines the internal threads 94 of the dust cap 36. The internal threads 94 are positioned within the annular receptacle 120 and face radially inwardly from the outer sleeve 118 toward the central dust plug axis 106.

Figure 5:
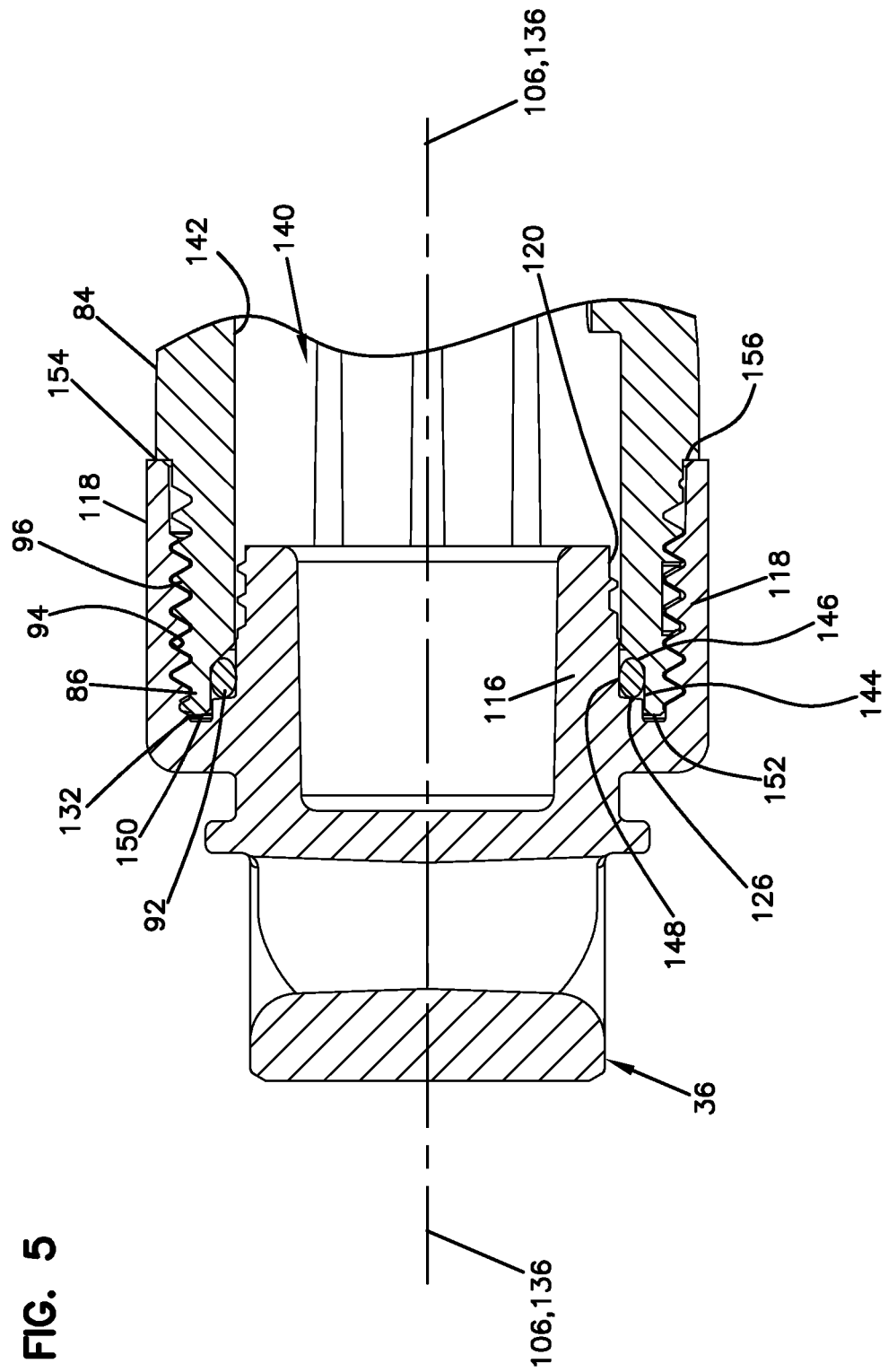
FIG. 5 is a cross-sectional view taken along section line 5-5 of FIG. 1.

As shown at FIG. 5, the protective housing 84 of the hardened jack 32 defines a central housing axis 136 that coaxially aligns with the dust cap axis 106 when the dust cap 36 is secured to the distal end 86 of the protective housing 84. The external threads 96 of the hardened jack 32 are provided at the distal end 86 of the protective housing 84 and are configured to face radially outwardly from the central housing axis 136 of the protective housing 84. As indicated above, the internal threads 94 provided on the outer sleeve 118 of the dust cap 36 and the external threads 96 provided at the distal end 86 of the protective housing 84 are configured to mate and form a threaded connection between the dust cap 36 and the protective housing 84.

As shown at FIGS. 7 and 8, the distal end 86 of the protective housing 84 defines an interior bore 140 including a main portion 142 and a sealing portion 144. The sealing portion 144 of the interior bore 140 is distally and radially offset from the main portion 142 of the interior bore 140 by a ramp surface 146 (i.e., an incline surface). The sealing portion 144 and the main portion 142 of the interior bore 140 are cylindrical and the sealing portion 144 has a larger diameter than the main portion 142. When the dust cap 36 is secured to the distal end 86 of the protective housing 84, the sealing member 92 is axially compressed between the first radial step 126 of the dust cap 36 and the ramp surface 146 of the protective housing 84 (see FIG. 5). Additionally, still referring to FIG. 5, the seal 92 is radially compressed between the sealing portion 144 of the protective housing 84 and a cylindrical sealing surface 148 of the inner sleeve 116 of the dust cap 36.

Referring again to FIGS. 5, 7 and 8, the interior bore 140 of the protective housing 84 includes a chamfered portion 150 that expands the diameter of the interior bore 140 of the chamfered portion 150 extends from the sealing portion 144 of the interior bore 140 to a distal-most surface 152 of the protective housing 84. The chamfered portion 150 is configured to facilitate inserting the distal end 86 of the protective housing 84 over the sealing member 92 within the dust cap 36. When the dust cap 36 is fully installed on the protective housing 84, the distal-most surface 152 of the protective housing 84 fits within the deepest portion 132 of the annular receptacle 120 of the dust cap 36 (see FIG. 5).

Referring to FIG. 5, the dust cap 36 includes a stop surface 154 defined by the outer sleeve 118 at a proximal-most extent of the dust cap 36. In certain embodiments, stop surface 154 is oriented in a plane, generally perpendicular to the dust cap axis 106. When the dust cap 36 has been fully installed on the distal end 36 of the protective housing 84, the stop surface 154 abuts against an outer shoulder 156 of the protective housing 84 to provide a positive stop. In certain embodiments, the outer shoulder 156 is aligned along a plane that is perpendicular relative to the central housing axis 136.

To interconnect the hardened plug 28 and the hardened jack 32, the dust cap 34 is removed from the hardened plug 28 and the dust cap 36 is removed from the hardened jack 32. The hardened plug 28 and the hardened jack 32 are then inserted axially together such that the interface ends of the hardened plug 28 and the hardened jack 32 mate with one another. As the hardened plug 28 and the hardened jack 32 are inserted together, the interface pieces 42, 82 mate with one another to provide coarse alignment between the multi-fiber ferrules 40, 80. As the hardened plug 28 and the hardened jack 32 are continued to be axially inserted together, ferrule pins 160 (see FIG. 3) of the multi-fiber ferrule 40 of the hardened plug 28 are received within corresponding ferrule alignment openings 162 (see FIGS. 4 and 7) defined by the multi-fiber ferrule 80. The mating relationship between the alignment pins 160 and the alignment openings 162 provide precise alignment between the multi-fiber ferrules 40, 80 such that the optical fibers 44 supported by the multi-fiber ferrule 40 coaxially align with the corresponding optical fibers 62 supported by the multi-fiber ferrule 80. In this way, the optical fibers 44, 62 of the multi-fiber cables 26, 30 are optically connected together. The hardened plug 28 and the hardened jack 32 are securely retained in the fully inserted orientation by threading the retention nut 52 of the first fiber optic connector and fiber optic cable assembly 22 onto the external threads 96 provided at the distal end 86 of the protective housing 84 of the second fiber optic connector and fiber optic cable assembly 24. During the insertion process between the hardened plug 28 and the hardened jack 32, the distal end 86 of the protective housing 84 slides over the sealing member 50 and the sealing member 50 is compressed radially inwardly by the sealing portion 144 of the interior bore and is compressed axially by the ramp surface 146 of the interior bore 140. The distal-most surface 152 of the protective housing 84 can function as a stop surface that is oriented and generally perpendicular relative to the central housing axis 136 when the hardened plug 28 and the hardened jack 32 are fully inserted together. The distal-most surface 152 can abut against a raised shoulder 165 provided on the exterior of the protective housing 46 to provide a positive stop.

A dimensionally recoverable article is an article the dimensional configuration of which may be made substantially to change when subjected to treatment. Usually these articles recover towards an original shape from which they have previously been deformed, but the term "recoverable" as used herein, also includes an article which adopts a new configuration even if it has not been previously deformed.

A typical form of a dimensionally recoverable article is a heat recoverable article, the dimensional configuration of which may be changed by subjecting the article to heat treatment. In their most common form, such articles comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. The polymeric material has been cross-linked during the production process so as to enhance the desired dimensional recovery. One method of producing a heat recoverable article comprises shaping the polymeric material into the desired heat-stable form, subsequently crosslinking the polymeric material, heating the article to a temperature above the crystalline melting point (or, for amorphous materials the softening point of the polymer), deforming the article, and cooling the article while in the deformed state so that the deformed state of the article is retained. In use, because the deformed state of the article is heat-unstable, application of heat will cause the article to assume its original heat-stable shape.

In certain embodiments (e.g., in the depicted embodiments of the present disclosure), the heat recoverable article is a sleeve or a tube that can include a longitudinal seam or can be seamless. In certain embodiments, the heat recoverable sleeve has a dual wall construction including an outer, heat recoverable annular layer, and an inner annular adhesive layer. In certain embodiments, the inner annular adhesive layer includes a hot-melt adhesive layer. Such adhesive layer can be used to bond the sleeve to components such as a cable jacket or a portion of a connector. For example, the dimensionally recoverable sleeve 90 can be adhesively bonded to the cable jacket 66 and the proximal end 86 of the protective housing 84. Similarly, sleeve 46 can be adhesively bonded to the jacket of the cable 26 and to the protective housing 46.

In one embodiment, the heat recoverable sleeve is initially expanded from a normal, dimensionally stable diameter to a dimensionally heat unstable diameter that is larger than the normal diameter. The heat recoverable sleeve is shape-set to the dimensionally heat unstable diameter. This typically occurs in a factory/manufacturing setting. The dimensionally heat unstable diameter is sized to allow the heat recoverable sleeve to be inserted over two components desired to be coupled together. After insertion over the two components, the sleeve is heated thereby causing the heat recoverable sleeve to shrink back toward the normal diameter such that the sleeve radially compresses against the two components to secure the two components together. The adhesive layer is preferably heat activated during heating of the sleeve.

From the foregoing detailed description, it will be evident that modifications and variations can be made in the devices or methods of the disclosure without departing from the spirit or scope of the inventive aspects.

What is claimed is:

1. A dust cap for use with a fiber optic connector comprising:
   a proximal end;
   a distal end;
   a main body that defines a central dust cap axis that extends between the proximal and distal ends of the dust cap, the main body of the dust cap including inner and outer sleeves that extend around the central dust cap axis; and
   a distal projection located at the distal end of the dust cap, wherein the distal projection projects distally outwardly from the main body and is aligned along the central dust cap axis, wherein the distal projection has a plurality of wrench flats for allowing a wrench to be used to tighten the threaded connection between the dust cap and the distal end of a protective housing by turning the dust cap relative to the protective housing about the central dust cap axis, wherein the distal projection defines an opening that forms a pulling eye for allowing a pulling member to be connected to the dust cap and used to pull a fiber optic connector and cable assembly through a conduit, wherein the opening extends through two flats of the distal projection, and wherein the opening extends along an opening axis that is perpendicular to the central dust cap axis;
   wherein an annular receptacle is defined between the inner and outer sleeves, the annular receptacle having an open end positioned opposite from a closed end, wherein the closed end of the annular receptacle has a stepped configuration, the stepped configuration including first and second radial steps separated by an offset surface that extends distally from the first radial step to the second radial step, wherein the first radial step extends radially outwardly from the inner sleeve to the offset surface, and the second radial step extends radially outwardly from the offset surface to the outer sleeve;
   wherein the distal end of the protective housing is received within the annular receptacle through the open end of the annular receptacle, and the open end faces in a proximal direction; and
   wherein the inner sleeve includes first threads positioned within the annular receptacle that face radially outwardly from the central dust cap axis and that retain a sealing member on the inner sleeve, the sealing member forming an environmental seal between the dust cap and the protective housing for preventing contaminants from entering the protective housing.

2. The dust cap of claim 1, wherein the dust cap is configured to be secured to a protective housing by a threaded connection, the protective housing being attached to a fiber optic connector body, and wherein the protective housing includes a distal end and a proximal end.

3. The dust cap of claim 1, wherein the outer sleeve includes second threads positioned within the annular receptacle that face radially inwardly toward the central dust cap axis, wherein the distal end of the protective housing includes third threads that face radially outwardly from a central housing axis of the protective housing, wherein the central housing axis co-axially aligns with the central dust cap axis when the dust cap is secured to the distal end of the protective housing, and wherein the second and third threads mate to form the threaded connection between the dust cap and the distal end of the protective housing.

4. The dust cap of claim 1, wherein the distal end of the protective housing defines an interior bore including a main portion and a sealing portion, the sealing portion of the interior bore is distally and radially offset from the main portion of the interior bore by a ramp surface.

5. The dust cap of claim 4, wherein the sealing portion and the main portion of the interior bore are cylindrical and the sealing portion has a larger diameter than the main portion, the sealing member being axially compressed between the first radial step of the dust cap and the ramp surface when the dust cap is secured to the distal end of the protective housing.

6. The dust cap of claim 4, wherein the sealing member is radially compressed between the sealing portion of the interior bore of the protective housing and a cylindrical sealing surface of the inner sleeve of the dust cap when the dust cap is secured to the distal end of the protective housing.

7. The dust cap of claim 4, wherein the interior bore of the protective housing includes a chamfered portion that expands the interior bore as the chamfered portion extends from the sealing portion of the interior bore to a distal-most end of the protective housing.

8. The dust cap of claim 7, wherein the distal-most portion of the protective housing fits within a deepest portion of the annular receptacle when the dust cap is secured to the protective housing.

\* \* \* \* \*